(No Model.)

W. A. DOWNES.
LUBRICATOR.

No. 524,584.　　　　　　　　Patented Aug. 14, 1894.

Witnesses
A. L. Hobby
L. J. Whittemore

Inventor
William A. Downes
By Thos. S. Sprague & Son
Attys.

UNITED STATES PATENT OFFICE.

WILLIAM A. DOWNES, OF DETROIT, MICHIGAN, ASSIGNOR TO THE PENBERTHY INJECTOR COMPANY, OF SAME PLACE.

LUBRICATOR.

SPECIFICATION forming part of Letters Patent No. 524,584, dated August 14, 1894.

Application filed May 11, 1894. Serial No. 510,834. (No model.)

*To all whom it may concern:*

Be it known that I, WILLIAM A. DOWNES, a citizen of the United States, residing at Detroit, in the county of Wayne and State of Michigan, have invented certain new and useful Improvements in Lubricators, of which the following is a specification, reference being had therein to the accompanying drawings.

The invention consists in the peculiar construction of the cap and particularly in the device for adjusting the throw of the feed plunger, and the construction of the cap, and the escutcheon for controlling the fill and vent aperture.

Figure 1:
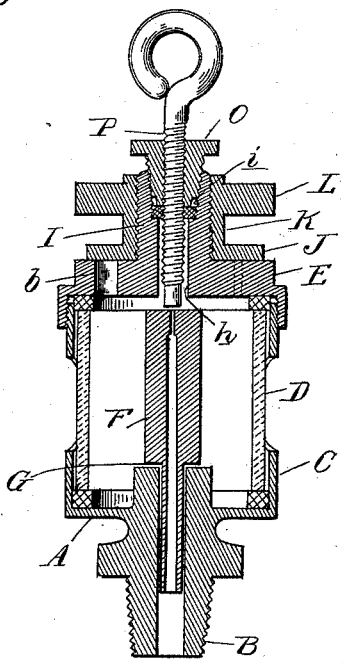
Figure 2:
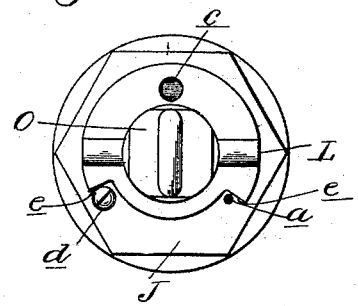
Figure 3:
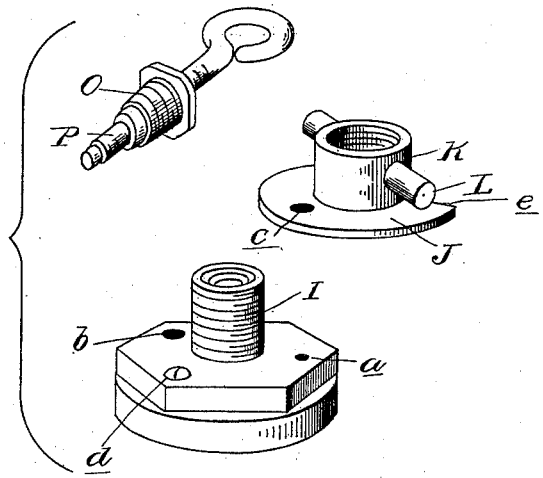

Figure 1 is a vertical, central, longitudinal section through a lubricator embodying my invention. Fig. 2 is a top plan view thereof. Fig. 3 is a detached perspective view of the parts of the cap and the adjusting devices.

The cup proper comprises the base A having the usual apertured securing nipple B, the casing C having the glass lining D and the cap E screw-threaded or otherwise secured to the upper end of the casing C and clamping the glass lining D between the top and bottom, suitable packing being interposed to make tight joints.

The feed aperture through the nipple B is controlled by means of a reciprocating plunger F which is provided with a central aperture, through which the oil may be fed and the shoulder G resting upon the interiorly projecting nipple on the base, the oil being adapted to be fed through the aperture in the nipple around the plunger and through the central aperture in the plunger.

The parts thus far described are of known and usual construction except as hereinafter set forth.

The lubricator is intended to be used in connection with a moving part of machinery, such as for oiling a crank pin, &c., and the oil is fed by the movement of the plunger, the length of the stroke of the plunger determining the amount of the feed.

The cap is provided with a central hub I exteriorly screw-threaded and beside this hub are vent and fill apertures $a$ $b$ and preferably a stop pin or screw $d$ against which shoulders $c$ on the escutcheon J are adapted to engage to limit the movement thereof. This escutcheon is provided with a central tubular hub K adapted to engage the screw threaded bearing on the outside of the hub I of the cap, and is provided preferably with arms L, by means of which it may be turned to register the aperture $b$ with corresponding aperture $c$ in the escutcheon for filling the oil cup through the cap, and uncovering the vent aperture $a$. By arranging this escutcheon on the screw threaded bearing on the hub it may be turned upon the top tightly, so as to perfectly close the fill and vent apertures through the cap by being jammed tightly on the same and thus positively prevent any possibility of leakage in the use of the device. The hub of the cap is provided with a lower guide bore $h$ and an upper enlarged screw-threaded bore $i$.

O is a packing nut exteriorly screw threaded and engaging in the bore $i$. This packing nut is provided with a central screwthreaded aperture in which the screwthreaded adjusting stem P is adapted to engage. This stem passes through the lower guide bore $h$ of the hub and its lower end is arranged in proximity to the upper end of the plunger, and acts as a stop to the upward movement thereof, so that by adjusting the stem up or down the throw of this plunger may be correspondingly adjusted.

What I claim as my invention is—

In an oil cup, the combination with the reciprocating plunger, of a cap having a vent and fill opening and a central apertured hub formed with an enlarged threaded bore at its upper end, an escutcheon for the fill and vent having an engagement with the hub, an adjusting packing nut having a central threaded aperture located in the enlarged bore of and having a threaded engagement with the hub, and the threaded adjusting stem passing through the nut, substantially as described.

In testimony whereof I affix my signature in presence of two witnesses.

WILLIAM A. DOWNES.

Witnesses:
JAMES WHITTEMORE,
L. J. WHITTEMORE.